Figure 1:
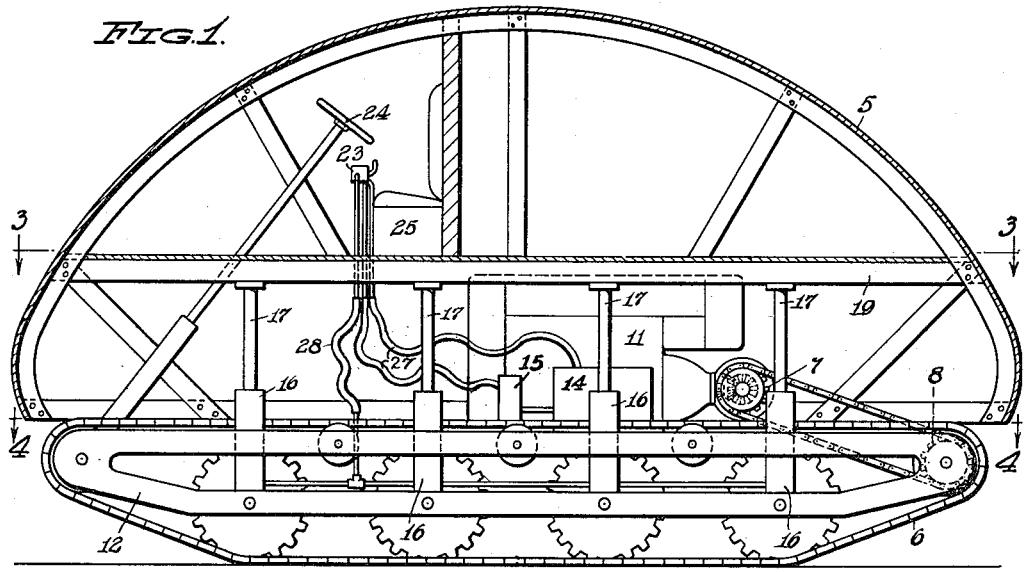

Sept. 25, 1945.  S. H. WEBSTER  2,385,480
MILITARY VEHICLE
Filed Jan. 17, 1942  3 Sheets-Sheet 1

INVENTOR,
SIDNEY H. WEBSTER
BY Martin J. Finnegan
ATTORNEY

Sept. 25, 1945. S. H. WEBSTER 2,385,480
MILITARY VEHICLE
Filed Jan. 17, 1942 3 Sheets-Sheet 2

INVENTOR,
SIDNEY H. WEBSTER;
BY Martin J. Finnegan
ATTORNEY.

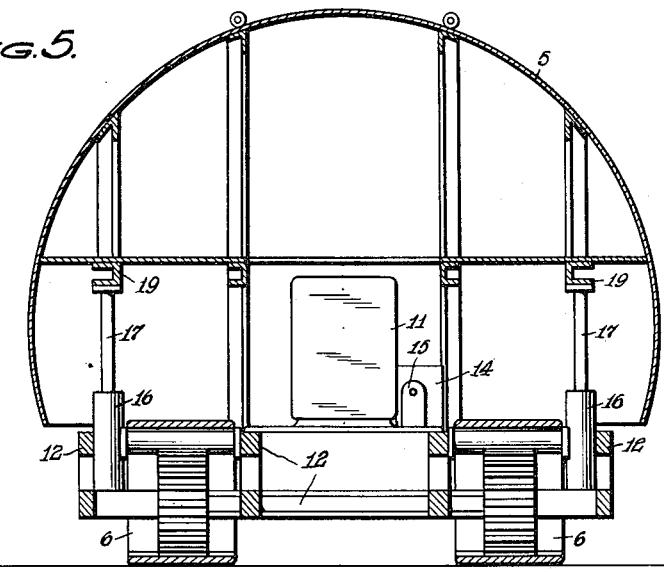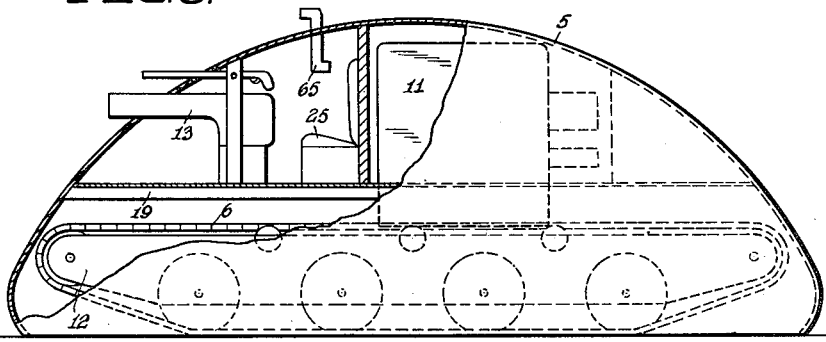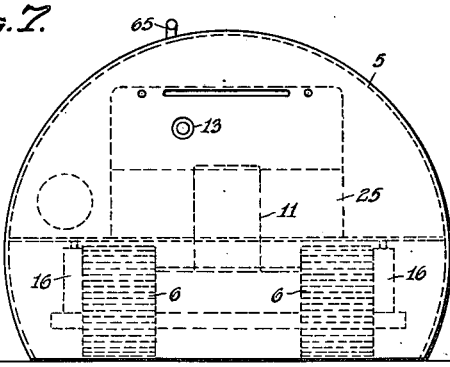

Patented Sept. 25, 1945

2,385,480

UNITED STATES PATENT OFFICE 2,385,480

MILITARY VEHICLE

Sidney H. Webster, Ridgefield Park, N. J., assignor to Bendix Aviation Corporation, South Bend, Ind., a corporation of Delaware Application January 17, 1942, Serial No. 427,192

4 Claims. (Cl. 180—9.1)

This invention relates to military vehicles, and particularly to armored tanks.

An object of this invention is to provide an armored tank of novel construction incorporating provisions for complete armoring and maneuverability, thereby permitting operation as a heavily armed, high speed, mobile anti-tank unit and as a stationary pillbox.

Another object of this invention is to provide complete protection for ground engaging parts and operating gear therefor through the use of a one-piece enclosing bonnet of armor which may be raised or lowered at will by the operator in such a manner as to provide maximum armored protection under all conditions encountered in mobile operation, including the entire range of topographical conditions.

A further object of this invention is to provide for the raising and lowering of the armored enclosing bonnet, gun emplacement, and crew's quarters as a unit when used as a stationary pillbox. This novel feature permits firing under protection of a barricade on advancing units, with the bonnet in the elevated position, after which the said bonnet may be lowered to take advantage of the protection afforded by the barricade. When gun emplacement, crew's quarters and armored bonnet have been returned to the lowered position, further protection from the placing of explosives underneath the unit is provided, as the armored bonnet may be lowered to a position that is flush with the terrain.

A further object of this invention is to provide in a tank construction rapid and adequate means of maintenance through novel features of construction whereby the armored enclosing bonnet complete with crew's quarters and gun emplacement may be removed as a unit, thereby permitting access to engine, accessories, hydraulic system, main frame and ground engaging members, all of which components may form an integral unit.

These and other objects of the invention will become apparent from inspection of the following specification when read with reference to the accompanying drawings wherein is illustrated the preferred embodiment of the invention. It is to be expressly understood, however, that the drawings are for the purpose of illustration only, and are not designed as a definition of the limits of the invention, reference being had to the appended claims for this purpose.

Figure 2:
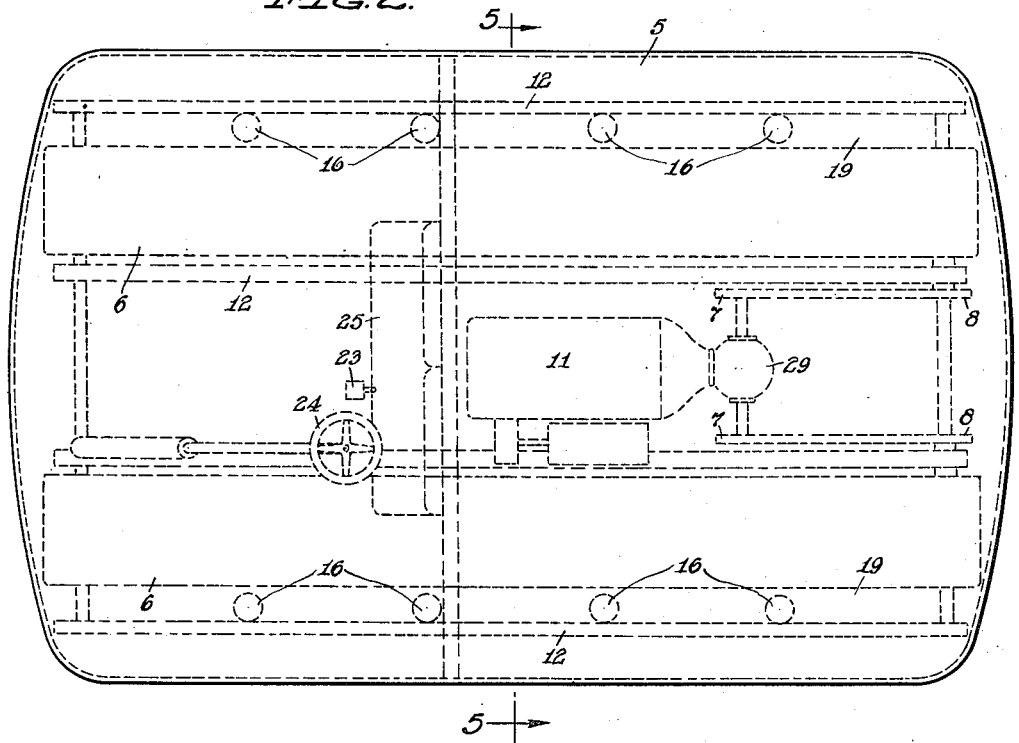
Figure 3:
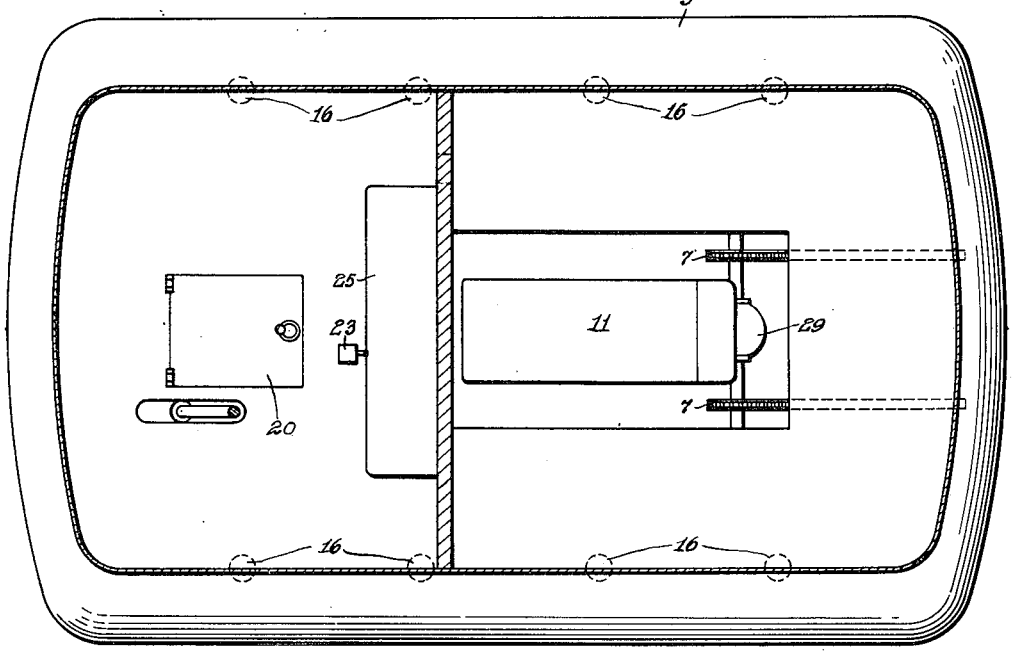
Figure 4:
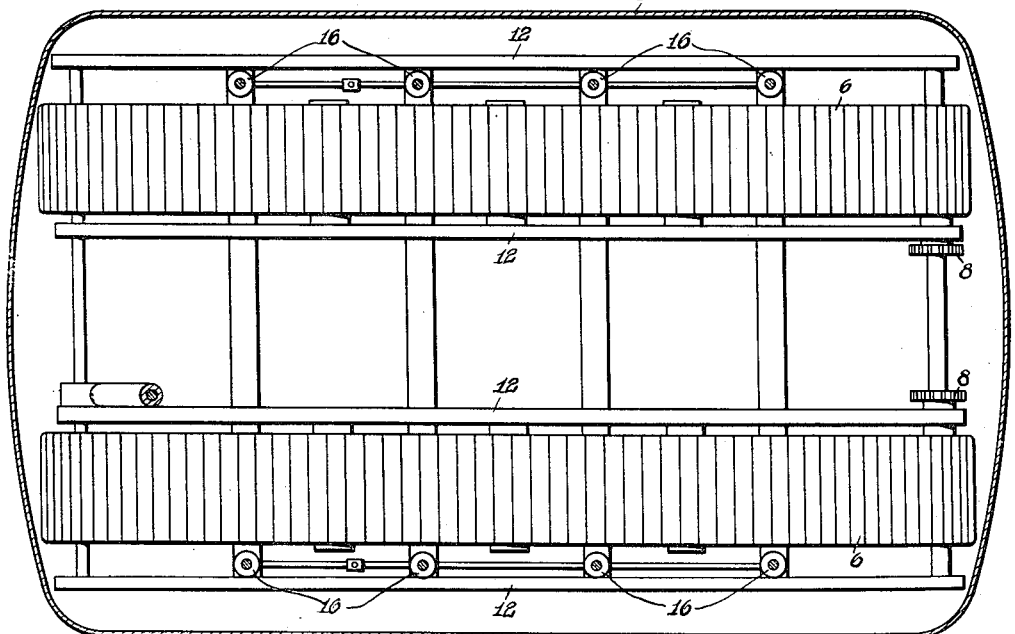

In the drawings,

Fig. 1 is a side view, with certain parts sectioned;

Fig. 2 is a plan view;
Fig. 3 is a view on line 3—3 of Fig. 1;
Fig. 4 is a view on line 4—4 of Fig. 1;
Fig. 5 is a view on line 5—5 of Fig. 2;
Fig. 6 is a side view, with the bonnet lowered; and
Fig. 7 is an end view, with the bonnet lowered.

The drawings show a tank having a bonnet 5, a ground-engaging tread or track 6, track-operating sprocket wheels 7, 8, a driving engine 11, and a frame 12 to support the engine 11, the gun assemblies 13 (Fig. 6) and hydraulic equipment, including a reservoir 14, a pump 15, and the hydraulic cylinders 16, 16 in which operate the pistons which control the elevation and lowering of the bonnet 5 throughout its range of movement in relation to the frame 12. Piston rods 17, 17 engage the longitudinally extending trusses 19, 19 of the bonnet which support a suitable flooring for the crew's quarters, said trusses being integrated with the bonnet shell at their ends, as are also the other truss elements shown best in Fig. 5. As shown in Figure 3 there is provided a trap door 20, through which entrance to the crew's quarters may be effected.

A valve 23 is mounted adjacent the steering wheel 24 and seat 25 which accommodates the driver and gunner (or gunners). This valve 23 controls flow of operating fluid from pump 15 to the hydraulic "jacks" 16, and back to the reservoir 14; the flow being by way of conduits 27 having extensible sections 28. A differential gear assembly 29 between engine 11 and sprockets 7 facilitates maneuverability.

It will be seen that the invention has the following advantages, in addition to those heretofore suggested:

1. Bonnet construction effects a reduction in total weight of armor; also causes gun fire to ricochet.

2. Bonnet completely encloses and protects tracks when stationary or when traveling over smooth terrain.

3. The small, compact, and high-speed characteristics enable the unit to outmaneuver enemy tanks. Thus it serves an analogous purpose to that of a torpedo boat in the Navy.

4. The unit may move under its own power to a given position where it can serve as a fixed emplacement.

5. The bonnet construction prevents placing of explosives under the unit.

6. The unit may be placed behind barricade, and the bonnet elevated as necessary to fire on approaching units.

7. The three piece construction permits interchangeability, of any unit—that is, bonnet, gun emplacement or frame with engine and tracks complete.

8. The unit may be readily serviced by lifting off the bonnet with gun emplacement. The crew may enter through a trap door in the bottom of the unit.

9. When operated over rough terrain such as open country, trenches, etc., the armored bonnet may be raised approximately 30" above the ground to permit clearance of obstructions and when operated on even terrain such as highways, desert, etc, the armored bonnet may be lowered to approximately 4" above the ground thereby permitting maximum protection of vulnerable parts under all conditions.

This invention will have its greatest utility when applied to vehicles that are equipped with a differential gear connection between the power plant on the one hand, and the right and left-hand track assemblies on the other; and the vehicles should also preferably be equipped with a retracting type of periscope (as indicated at 65 in the drawing of Figure 6) and gyroscopic mechanism for control of the positioning of the gun barrels.

Also provided on the bonnet are eye-bolts with which grappling hooks may engage, so that the bonnet may be hoisted off the tank, as by a suitable crane or derrick, when repairs or substitutions of parts are required.

What is claimed is:

1. In a tank, the combination of a power plant including engine, transmission, and track, a supporting frame for the engine and transmission, a vertically movable enclosing bonnet, means carried by said supporting frame for raising and lowering said bonnet, means for controlling the operation of said tank, said control means manually operable from a position that may be raised and lowered with said bonnet, and said bonnet arranged for enclosing said track therein at its extreme lowered position for the protection thereof.

2. In a tank, the combination of a power plant including engine, transmission, and track, a supporting frame for the engine and transmission, a vertically movable enclosing bonnet, means including hydraulic jacks carried by said supporting frame for raising and lowering said bonnet, first means for controlling the operation of said tank, second means for controlling the raising and lowering of said bonnet, said first and second means manually operable from a position that may be raised and lowered with the bonnet for the convenience of the operator, and said bonnet arranged for receiving therein the aforesaid track at its extreme lowered position so as to afford protection thereto.

3. A tank comprising, in combination, a power plant including an engine, transmission and track, a supporting frame for the engine and transmission, said supporting frame carried above the surface of the ground by the track, an enclosing bonnet vertically movable in relation to said frame, means carried by said supporting frame for lowering said bonnet into a shielding relationship to said track, means for controlling the operation of said tank, said control means manually operable from a position that may be raised and lowered with said bonnet in relationship to said frame.

4. A tank comprising, in combination, a power plant including an engine, transmission and track, a supporting frame for the engine and transmission, said supporting frame carried above the surface of the ground by the track, an enclosing bonnet vertically movable in relation to said frame, means carried by said supporting frame for lowering said bonnet into a shielding relationship to said track, first means for controlling the operation of said tank, second means for controlling the raising and lowering of said bonnet, said first and second means manually operable from a position that may be raised and lowered with said bonnet in relationship to said frame, a flooring carried by said bonnet and a trap door provided in said flooring, whereby crew members of the tank may enter the tank from the exterior thereof upon the vertically movable bonnet being raised from said shielding relationship to said track.

SIDNEY H. WEBSTER.